United States Patent [19]

Ikeda

[11] Patent Number: 5,721,970
[45] Date of Patent: Feb. 24, 1998

[54] DISTANCE MEASURING DEVICE FOR A CAMERA

[75] Inventor: Takahiro Ikeda, Kawachinagano, Japan

[73] Assignee: Minolta Co., Ltd., Osaka, Japan

[21] Appl. No.: 786,344

[22] Filed: Jan. 23, 1997

[30] Foreign Application Priority Data

Jan. 29, 1996 [JP] Japan ................................ 8-035630

[51] Int. Cl.$^6$ ........................................ G03B 17/00
[52] U.S. Cl. ........................ 396/56; 396/103; 396/104
[58] Field of Search ........................... 396/56, 57, 59, 396/104, 103

[56] References Cited

U.S. PATENT DOCUMENTS

| | | | |
|---|---|---|---|
| 4,937,604 | 6/1990 | Yoshida et al. | 396/59 |
| 5,093,679 | 3/1992 | Taniguchi et al. | 396/56 |
| 5,184,167 | 2/1993 | Iida et al. | 396/59 |
| 5,517,276 | 5/1996 | Higaki et al. | 396/56 |

Primary Examiner—Russell E. Adams
Attorney, Agent, or Firm—Burns, Doane, Swecker & Mathis, LLP

[57] ABSTRACT

A distance measuring device for a camera uses a normal photographing mode which and a special photographing mode can be selected, and where in the special photographing mode includes a remote control photographing mode. The distance measuring device detects an object distance and judges whether the distance detection is effective or not, and a lens is driven based on a predetermined value when it is judged that the distance measurement is not effective in a normal photographing mode. In contrast, in a remote photographing mode, when it is judged that the distance measurement is not effective, the lens drive is not driven based on a predetermined value. Rather but an object distance is measured again, and thus a probability of in-focus photographing is improved.

17 Claims, 4 Drawing Sheets

DISTANCE MEASURING DEVICE FOR A CAMERA

BACKGROUND OF THE INVENTION

1. Field of the Invention

The present invention relates to a distance measuring device for a camera having a remote control photographing function and auto-focusing function.

2. Description of the Prior Art

Conventionally, in a remote control photographing mode (not a mode of pushing down a release button of a camera by the hand of an operator, but a mode of operating the camera at a distance), when a distance measurement start switch (SW1) is ON, a distance to an object to be photographed is detected, and this distance is memorized as a measured distance value (auto focus AF lock), and the value is maintained memorized even if the switch SW1 is OFF. At this time, if a remote control signal is received, a lens is driven based on the measured distance value which has been memorized, and then a photographing is executed in the remote control photographing mode.

Further, when an object distance is detected by a passive AF method at a remote control photographing mode, and distance measurement can not be executed due to the absence of contrast in an object and an excessively low brightness, a lens is driven to a predetermined position by another memorized value not considering an actual distance to an object to be photographed, and a photographing is executed by actuating a shutter.

However, as above-mentioned, when the camera is incapable of measuring a distance at a remote control photographing mode, a lens is driven to a predetermined position and a photographing operation is executed. Therefore it is possible that photographing is not executed in a focus state.

SUMMARY OF THE INVENTION

It is an object of the present invention to overcome the above-mentioned disadvantage existing in the prior art. It is another object of the present invention to provide a distance measuring device for a camera wherein an accurate focus detection can be achieved in a normal photographing mode and in a special photographing mode such as a remote-control mode by not memorizing a measured distance value when the camera is incapable of measuring a distance in a remote-control mode etc., and by executing a distance measurement operation again when a remote control signal is received.

To accomplish the above-mentioned object, the distance measuring device for a camera comprises a distance measuring device for measuring object distance related information, a judgment device for judging whether it is possible to measure an object distance or not, and a controller for controlling the distance measuring device to measure object distance related information again in accordance with a release signal output in a remote control photographing mode when this mode is selected and it is judged that object distance related information can not be measured.

DETAILED DESCRIPTION OF THE PREFERRED EMBODIMENT

Figure 1:
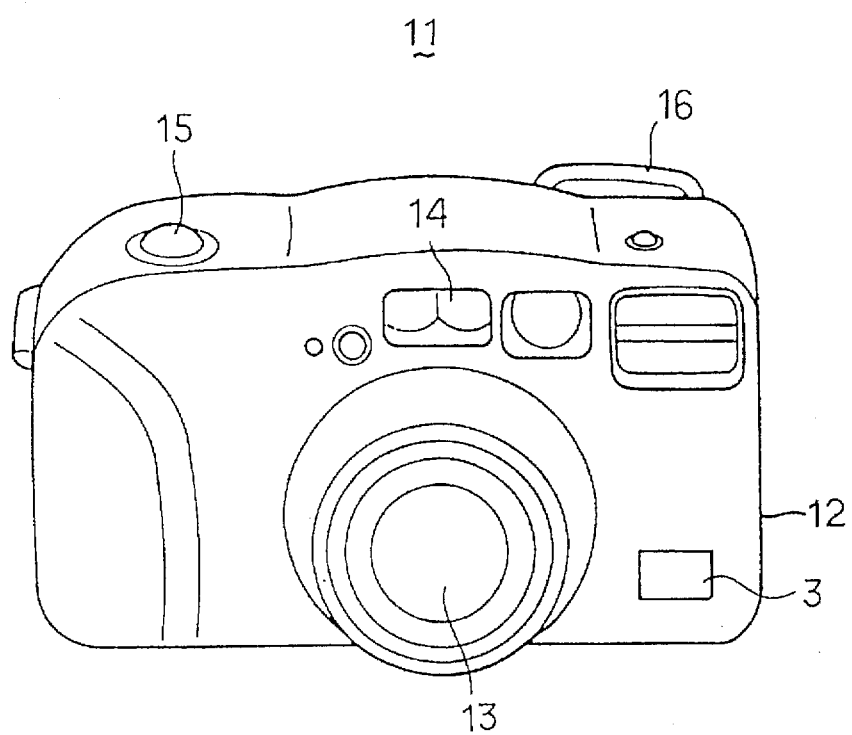
FIG. 1 is a view showing a state of a camera having a remote control receiver according to an embodiment of the present invention.
Figure 1:
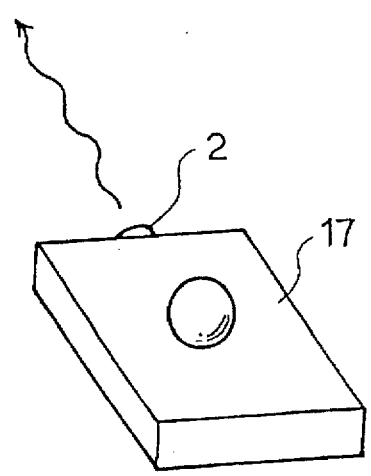
Figure 2:
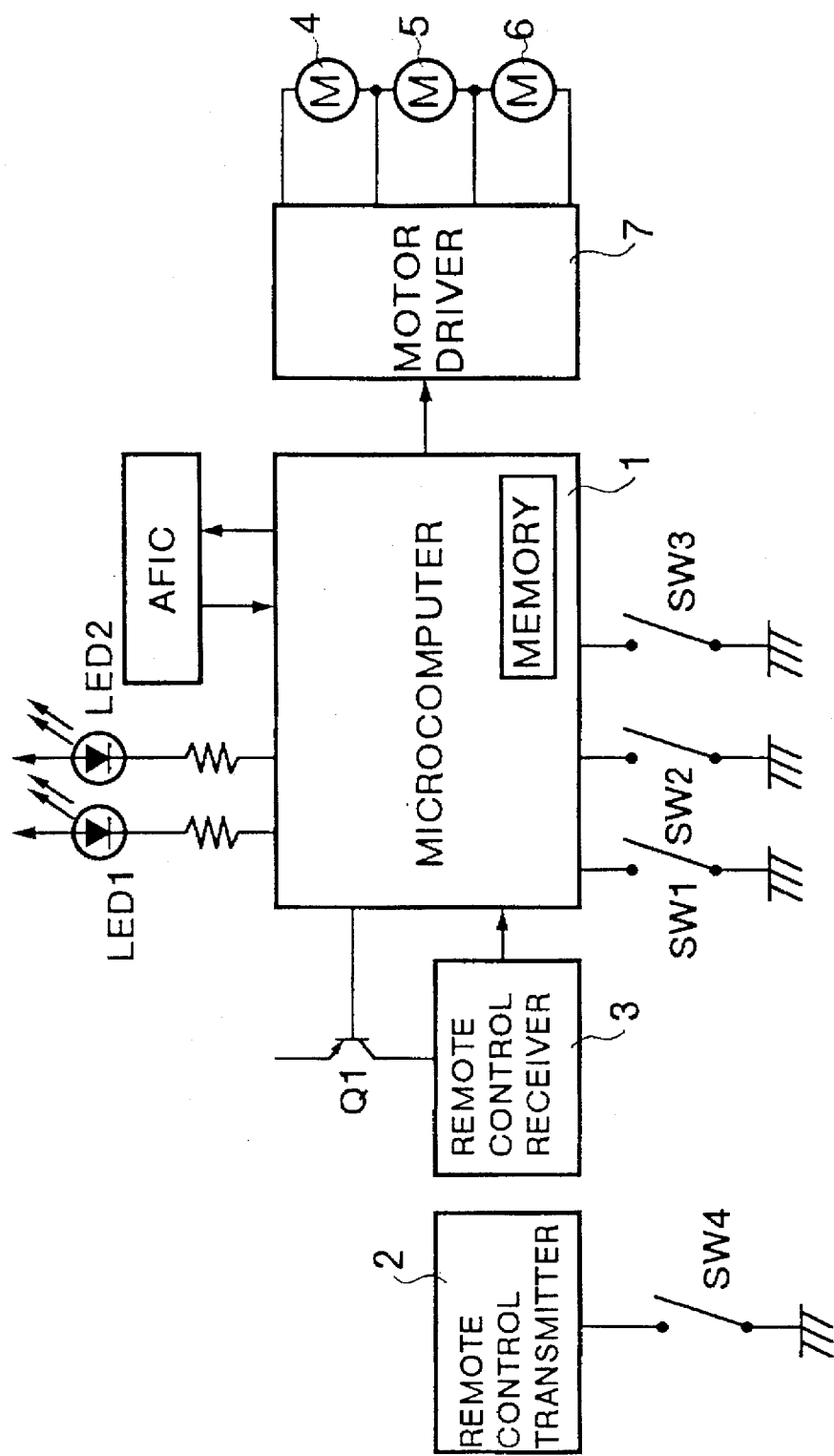
FIG. 2 is a block diagram of a control circuit of a distance measuring device of the camera in the present embodiment.
Figure 3:
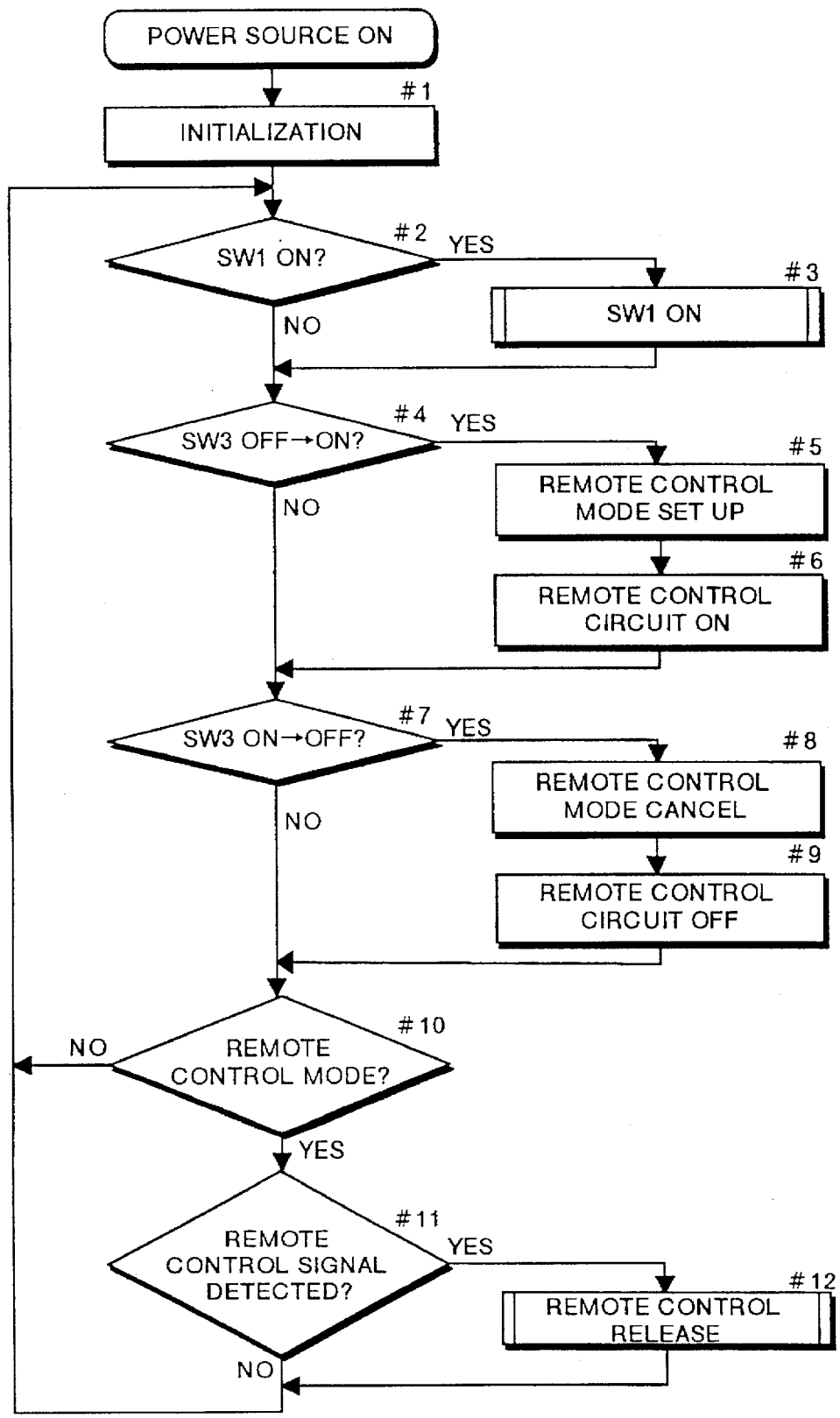
FIG. 3 is a flowchart showing the operation of the camera when a power source of the camera is on, and FIG. 4 is a flowchart showing the operation of the camera when a distance measurement start switch is on and the operation of the camera upon at a remote control release.
Figure 4:
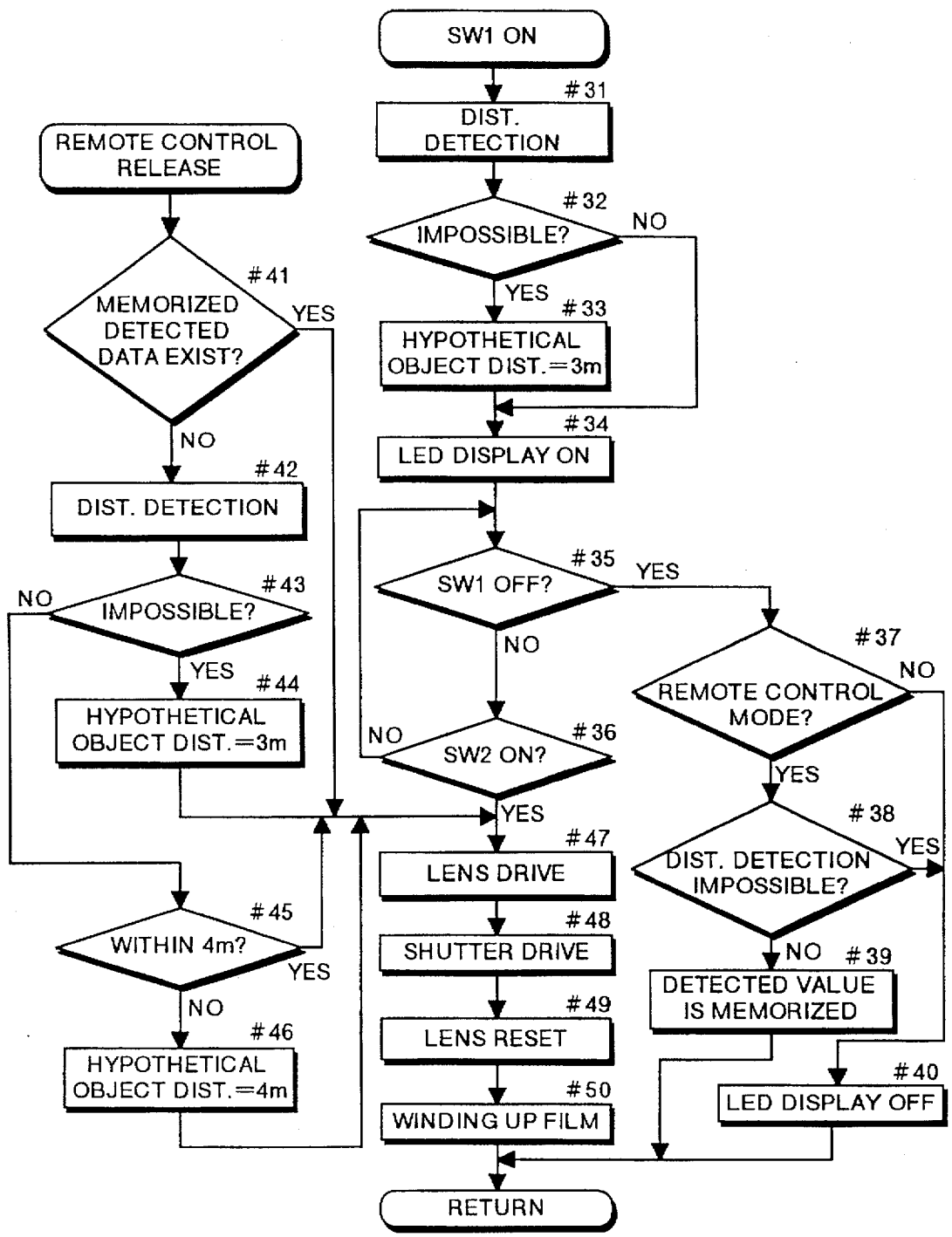

A distance measuring device of a camera according to an embodiment will be now explained referring to FIGS. 1, 2, 8, and 4. FIG. 1 is a view showing a state of a camera having a remote control receiver according to an embodiment of the present invention. FIG. 2 is a block diagram of a control circuit of the distance measuring device according to this embodiment. FIG. 3 is a flowchart showing the operation of the camera when a power source of the camera is ON, and FIG. 4 is a flowchart showing the operations of the camera when a distance measurement start switch is ON and the operation of the camera upon a remote control release.

In FIG. 1, a camera 11 comprises a body 12, a lens 13, a distance measurement section 14, a release button 15, a finder 16, and a remote control receiver 3. Further, a remote controller 17 having a remote control transmitter section 2 is provided.

In FIG. 2, a microcomputer 1 is a microprocessor which controls the camera 11, and operates as a controller for controlling a lens drive and a release operation in accordance with whether a distance measurement can be executed or not when the camera receives a remote control signal in a remote control photographing mode. The controller also overall function of the camera such as distance measurement operation, winding up the film, a lens drive operation and a shutter drive operation. Furthermore, the microcomputer 1 contains a memory for memorizing an object distance, a distance measurement impossibility detection device for detecting whether a distance measurement can be executed or not, a memory prohibition device for preventing actuation of the memory when a distance measurement can not be executed, and a predetermined value output device for outputting a predetermined object distance when a distance measurement can not be executed.

A distance measurement start switch SW1 (hereinafter referred to as simply switch SW1) is a switch for starting an object distance measurement, and it is in an ON state upon half-pushing of a release button (not shown). A release start switch SW2 (hereinafter referred to as simply switch SW2) is a switch for starting a photographing by opening a shutter, and it is in an ON state upon a complete pushing down of the release button. A light emitting diode LED1 (hereinafter simply LED1) indicates that a distance measuring is completed and a light emitting diode LED2 (hereinafter simply LED2) indicates that a distance measurement can not be executed. The light emitting operation of the LED1 and LED2 is controlled by the microcomputer 1. The LED1 displays an indication of distance measuring completion by emitting light when a distance measurement is completed. The LED2 displays an indication of distance measuring incapability by emitting light when a distance measurement can not be done due to the absence of contrast in an object to be photographed.

A photographing mode change switch SW3 (hereinafter refers switch SW3) is a photographing mode change device which selects and turns over a normal photographing mode and a remote control photographing mode. By switching ON the switch SW3, a remote control photographing mode, which is a mode in which an operator is able to operate a release button in the distance by not actually pushing down the button, is selected. And by turning off the switch SW3, a normal photographing mode, which is a mode in which an operator actually pushes down the release button, is selected.

A remote control release switch SW4 (hereinafter simply switch SW4) is a switch for enabling the start of a release in a remote control photographing mode. A remote control transmission unit 2 transmits a release signal by making a LED emit the signal when the switch SW4 is ON. A remote control receiving unit 3, and a transistor Q1 comprising a remote control signal receiving device, receive the remote control signal which is transmitted from the remote control transmission unit 2, and output the signal to the microcomputer 1. The transistor Q1 is for supplying a power source to the remote control receiving unit 3.

An integrated circuit for auto focusing (hereinafter referred to as AFIC) comprises the distance measurement device and the distance measurement impossibility detection device along with the switch SW1 and the like. The AFIC is a passive system, i.e., it is an IC which meters a distance by a focusing construction according to a method of superposing double images. When a distance measurement is finished, the AFIC outputs the measured distance value, and when a distance measurement can not be executed due to the absence of in contrast an object to be photographed, the AFIC outputs a signal informing that determination to the microcomputer 1.

A lens motor 4 executes moving in and out of a lens, a shutter motor 5 executes opening and shuttering a shutter, and a feeding motor 6 executes winding up the film. A motor driver 7 drives each of the motors based on control signals from the microcomputer 1.

In a camera with the above-mentioned construction according to this embodiment, when the microcomputer 1 detects an impossibility of distance measurement in a remote photographing mode using the distance measurement impossibility detection device, the camera is actuated so that a memory prohibited device does not memorize object distance data in the memory. Then, remote control photographing mode, when a remote control signal receiving device (which is composed of the microcomputer 1, the remote control receiving unit 3 and the transistor Q1), receives a remote control photographing signal, and if the camera is capable of measuring a distance and the measured distance value is memorized in the memory, the controller drives a lens using the lens motor 4 and the like and executes a release based on the distance value measured and actually memorized. On the other hand, when a remote control signal is received the remote control photographing mode, if the camera is incapable of measuring a distance and a measured value is not memorized in the memory, the controller controls the execution of a distance measurement operation again using the AFIC, and if it is possible to measure the distance, the camera controls the execution a lens operation and a release based on the measured distance value. However, if it is not possible to measure the distance, the camera is controlled so as not to execute a lens drive operation and a release based on object distance data which is output from a predetermined value output device in the microcomputer 1.

Now, the operation of distance measurement after supplying electricity to the camera up to a remote control release will be explained referring to FIG. 3. When electricity is supplied to a camera, first of all, an initialization is executed (#1, only step numbers will be shown hereinafter). That is, the camera clears a previous measured distance value, and displays an indication thereof using the LED1 for displaying distance measurement completion, and the LED2 for displaying distance measurement incapability. Then the camera comes into a state of waiting for operational commands for the next photographing.

Then, the switch is judged whether the switch SW1 is ON or not (#2). If it is ON, a sub-routine for measuring an object distance is executed (#3, described later in detail with reference to FIG. 4) proceeds to a judgment whether the switch SW3 (mode change device) is changed from OFF to ON or not (#4). Here, when the switch SW1 is not ON, that is, a distance measurement operation is not executed (#2, NO), the sub-routine for distance measurement (#3) is not executed, and the routine proceeds to a step #4 directly after the step #2.

Then, it is judged whether the switch SW3 is changed from OFF to ON or not, that is, whether a normal photographing mode is changed over to a remote control photographing mode or not (#4). If it is changed to the remote control photographing mode, the remote control photographing mode is set up (#5), and a remote control circuit is turned ON (#6), and the routine proceeds to a step #7. If the switch SW3 is not changed from OFF to ON (#4, NO), the routine proceeds to the step #7 directly.

Next, it is judged whether the switch SW3 is changed from ON to OFF or not (#7), that is, whether the switch is changed from the remote control photographing mode to the normal photographing mode or not. If it is changed from the remote control photographing mode to the normal photographing mode, the previously set up remote control mode is canceled (#8), and the remote control circuit is turned OFF (#9). If the switch SW3 is not changed from ON to OFF (#7, NO), the routine proceeds to a step #10 directly.

Next, it is judged whether the currently set up photographing mode is the remote control photographing mode or not (#10). Here, if the camera is in the normal photographing mode, that is, if the routine is not the remote control photographing mode (#10, NO), it returns to the step #2 again, and the same proceedings are repeated as explained above. Then, if it is judged that the remote control photographing mode is set up (#10, YES), the routine enters a state of waiting for a detection of a remote control signal by the remote control receiving unit 3 (#11), and when the remote control signal is detected, the routine proceeds to a sub-routine for remote control release (#12, described later in detail with reference to FIG. 4). Here, if the remote control signal is not detected at the step (#11, NO), a photographing is not executed and the procedure returns to the above-mentioned step #2.

Now, referring to FIG. 4, proceedings of sub-routines for the switch SW1's ON processing (FIG. 3, #3), and for remote control release processing (FIG. 3, #12) will be explained. In the sub-routine of distance measurement, first of all, the camera detects an object distance by actuation of the AFIC (#31), and then, it is detected whether the distance measurement can be executed or not (#32). If it is impossible to measure an object distance due to the absence of contrast or excessively low brightness in the object, an object distance value is set to a predetermined value (3 meters in this embodiment) by the microcomputer 1 (using a predetermined value output device) (#33), and the LED2 displays that the distance measurement can not be executed (#34). If it is detected that the camera is capable of measuring an object distance (#32, NO), an object distance value is not set to the predetermined value, and the LED1 displays that the distance measurement is finished (#34). Here, after the distance measurement at the step #31, the measured object distance data is maintained at a data maintaining unit in the distance measuring device (it can also be maintained in the microcomputer 1, not in the distance measuring device).

In the above-mentioned display by the LEDs, it is displayed that the distance measurement is completed by the blinking of LED1, and it is displayed that the distance measurement can not be executed by the blinking of LED2. Therefore, based on the displayed information, a user can execute appropriate operations, such as executing a photographing or artificially changing an object distance by moving the object, and so on. For example, the user selects these operations: executing a photographing by pushing down the release button completely, which has been in a state of being half-way pushed down (distance measurement start) and opening the shutter, or turning off the switch SW1, (that is giving up the distance measuring and the photographing with the display of LED2, which tells that the object distance can not be measured,) or seeking another try at photographing by moving the object and turning on the switch SW1.

Now, it is again detected whether the switch SW1 is OFF or not, that is whether, a command of distance measurement has been maintaining or not (#35), to deal with the above-mentioned choices by the user. When the switch SW1 is not OFF, that is the command of distance measurement has been maintaining, then it is detected whether the switch SW2 is ON or not, that is, whether a photographing is to be executed or not (#36). When the switch SW2 is OFF, it returns to the step #35, and detects whether the command of distance measurement has been maintaining or not.

If it is judged NO at the step #35, and it is also judged NO at the step #36, the proceedings are repeated in a loop of #35 and #36 as long as the camera is in a state such that a photographing is not executed regardless of the maintaining of a command of distance measurement.

Next, when the command of distance measurement is canceled at the judgment of the step #35, the routine proceeds to a step #37 and it is judged whether a photographing mode is a remote control mode or not. This means that the switch SW1 is turned ON once and turned OFF after a distance measurement operation without executing a photographing. Hence, if the current photographing mode is a remote control photographing mode, and the latest measured distance information is effective, the information is memorized and the information can be utilized for the following photographing in the remote control photographing mode so that a remote control photographing operation can be executed more quickly. In other words, when it is detected that a remote control photographing mode has been activated (#37, YES), it is judged whether the distance measurement is impossible or not (#38), and the judgment is NO, that is, it is capable of measuring a distance, the measured object distance is memorized at the memory (#89), and then, the distance is applied to the following remote control photographing as measured distance information. On the other hand if, the result of the judgment is YES at the step #38, that is, when the camera is incapable of measuring an object distance, the object distance is not obtained (including a case of low reliability of object distance). Thus, the measured object distance is not memorized and the displaying function by the LEDs is completed (that is, the LED1 for displaying the completion of a distance measurement and the LED2 for displaying a distance measurement incapability), and when the displays were canceled (#40), the procedure returns to the step #4. Here, a process flow which prevents the routine from going through step #39 when it is judged YES at the step #38, provides a memory prohibition device.

When a photographing mode is not a remote control mode (#37, NO), the routine proceeds to the step #40 directly, and the procedure returns.

Now, when the switch SW2 is ON (#36, YES), the lens drive is controlled based on an object distance data maintained at the data maintaining unit, and the camera adjusts its lens (#47), opens and closes the shutter (#48), executes a photographing, and afterwards the lens is reset to home position (#49), and a film supplied for photographing is wound up (#50), and then the procedure returns. As above-mentioned, the lens drive is controlled based on the object distance data maintained in the data maintaining unit at a normal photographing mode.

A sub-routine of a remote control release will be now explained. First of all, it is judged whether an object distance data determined before the remote control release has been memorized at the memory (#41). When the object distance data has been memorized, the camera adjusts its lens immediately by use of the memorized object distance value without executing another distance measurement operation (#47), and it executes the photographing proceedings following the step #48. That is, when an object distance is detected (#31) and it is judged that the camera is capable of measuring the distance in a remote control photographing mode, the object distance data is inputted to the memory from the data maintaining unit, and based on the memorized object distance data in the memory, a lens drive is controlled.

On the other hand, when a distance measurement value is not memorized (#41, NO), a distance measurement operation is executed again (#42), and it is judged whether the distance measurement can be executed or not (#43). If it is judged that the camera is incapable of measuring the distance (#43, YES), a distance measurement value is set at a predetermined distance data (3 meters in the present embodiment) by the microcomputer 1 (using a predetermined distance value output device), and the lens drive is controlled and the camera adjusts the lens based on the predetermined distance data, and it enters the photographing operation the same as discussed above.

Further, when it is judged that distance measurement can be executed (#43, NO), the measured object distance data is memorized in the memory from the data maintaining unit, and then the procedure goes to a step #45 where and it is judged whether an object distance measurement value which was detected in step #42 is within 4 meters or not (#45). When the object distance value is within 4 meters, it is regarded as a reliable value, and the lens drive is controlled and the camera adjusts the lens based on the object distance data (#47), and the camera enters a photographing operation the same as discussed above. When the object distance value is not within 4 meters, the distance is regarded as an unreliable value, and the object distance value is set at 4 meters because there is no problem of setting 4 meters, for example, at an ordinary remote control mode (#46), and the camera adjusts the lens based on the value (#47), and executes a photographing. Here, if the camera incapable of measuring an object distance, an object distance data is not memorized, and the status of the camera is reflected by the content in the memory, which is reset when the power source is turned ON and is memorized in an initial value. Accordingly, the camera is able to judge whether a distance measurement can be executed or not by detecting whether measured object distance data is memorized in the memory or whether the content in the memory, which is reset when power source is turned ON, is memorized in an initial value.

Moreover, in the above-mentioned embodiment of the present invention, although an object distance is set at a predetermined value of 3 meters, the value of 3 meters, which is often detected relatively in ordinary photographing, is just adopted from experience in order to execute photographing in case of impossibility of distance measurement. Thus the predetermined object distance value is not limited to 3 meters. Further, when it is possible to measure an object distance and the distance value is not within 4 meters, the distance value is set at 4 meters. When the value set as above, there is no problem in an ordinary remote control photographing, and the value is optionally changeable.

While the invention has been described in its preferred embodiment in which an object distance is measured by the distance measuring device, it may be possible that the amount of de-focusing is measured by the device. Since an amount of de-focusing and an object distance are proportional in a camera of using the light passive auto-focusing method, the amount of de-focusing can be memorized in the memory. Moreover, in a camera of TTL auto focusing method such as SLR (Single Lens Reflex), an amount of de-focusing is calculated, and an object distance is calculated based on an amount of lens drive from a predetermined position considering the amount of de-focusing, and then the obtained object distance is memorized in the memory. Here, the calculated amount of de-focusing can be input in the memory directly without calculating an object distance as above-mentioned, and a lens can be driven to an in-focus position in accordance with the amount of de-focusing when release signal is input. Furthermore, an active auto focusing method (triangular distance measurement using infrared LED) can substitute for the passive auto focusing method in the above-mentioned embodiment.

What is claimed:

1. A camera capable of selecting a normal photographing mode and a special photographing mode, and controlling a release operation upon receiving a release signal output when either one mode is selected, comprising:

a distance measuring device for measuring first photographing object distance related information;

a judgement device for judging whether the first object distance related information can be used to measure distance to the object or not by the distance measuring device; and, a controller for controlling the distance measuring device to measure second object distance related information in accordance with a release signal output in the special photographing mode when the special photographing mode is selected and it is judged that the first object distance related information can not be used to measure the distance to the object.

2. The camera as claimed in claim 1, wherein the special photographing mode is a remote control photographing mode, and the release signal output in the special photographing mode is a remote control signal which is transmitted from a remote controller, and the camera further comprises a receiver for receiving the remote release signal.

3. The camera as claimed in claim 1, further comprising a lens driver which drives a lens for photographing.

4. The camera as claimed in claim 3, wherein the lens driver drives the lens to a predetermined position when it is judged that the second object distance related information can not be used to determine the distance to the object.

5. The camera as claimed in claim 3, wherein the lens driver drives the lens based on the first measured object distance related information in response to the release signal output in the special photographing mode when the special photographing mode is selected and its is judged that the first object distance related information can be used to measure the distance to the object.

6. The camera as claimed in claim 3, wherein the lens driver drives the lens based on the first measured object distance related information when the normal photographing mode is selected and the first object distance related information can be used to measure the distance to the object, and the lens driver drives the lens to a predetermined position when the first object distance related information can not be used to measure the distance to the object.

7. A camera capable of selecting a normal photographing mode and a special photographing mode, and controlling a release operation upon receiving a release signal output when either one mode is selected, comprising:

a distance measuring device for measuring first photographing object distance related information;

a judgement device for judging whether the object distance can be measured or not on the basis of the first photographing object distance related information produced by the distance measuring device;

a memory for memorizing a judgement data indicating whether the first object distance related information can be used to measure the object distance or not when the special photographing mode is selected; and, a controller for controlling the distance measuring device to measure second object distance related information when the special photographing mode is selected and a data indicating the impossibility of object distance measurement is memorized in the memory at the time of outputting of the release signal in the special photographing mode.

8. The camera as claimed in claim 7, wherein the special photographing mode is a remote control photographing mode, the release signal output in the special photographing mode is a remote control signal transmitted from a remote controller, and the camera further comprises a receiver for receiving the remote control signal.

9. The camera as claimed in claim 7, wherein the judgement data showing that object distance related information can be used to measure the object distance, which is memorized in the memory, comprises object distance data representative of the distance to the object, and the judgement data showing that object distance related information can not be used to measure the object distance, which is memorized in the memory, comprises data which is not necessarily representative of the distance to the object.

10. The camera as claimed in claim 9, wherein the data which is not necessarily representative of the distance to the object comprises data which is maintained in the memory in its original initialized state upon application of power to the camera.

11. A camera capable of selecting a normal photographing mode and a special photographing mode, and controlling a release operation upon receiving a release signal output when either one mode is selected, comprising:

a distance measuring device for measuring first photographing object distance related information;

a judgement device for judging whether the first object distance related information can be used to measure the distance to the object or not by the distance measuring device;

a memory for memorizing object distance related data when the special photographing mode is selected and it is judged that the first object distance related information can be used to measure the distance to the object, and not memorizing object distance related data when it is judged that the first object distance related information can not be used to measure the distance to the object;

a lens driver for driving a lens;

a first controller for controlling the lens drive based on the first object distance related information output from the distance measuring device when the normal photographing mode is selected and the first object distance related information can be used to measure the distance to the object; and, a second controller for controlling the lens drive based on the object distance related data memorized in the memory when the special photographing mode is selected and the object distance related data is memorized in the memory.

12. The camera as claimed in claim 11, wherein the special photographing mode is a remote control photographing mode, the release signal output in the special photographing mode is a remote release signal which is transmitted from a remote controller, and the camera further comprises a receiver for receiving the remote release signal.

13. The camera as claimed in claim 11, wherein second object distance related information is detected by actuating the distance measuring device when the release signal is output in the special photographing mode when the object distance related data is not memorized.

14. The camera as claimed in claim 13, wherein the judgement device judges whether the second object distance related information can be used to measure the distance to the object or not, and if it is judged that the second object distance related information can not be used to determine the distance to the object, the lens driver drives the lens to a predetermined position.

15. A method of measuring an object distance in a camera which is capable of selecting a normal photographing mode and a special photographing mode, and controlling a release operation upon receiving a release signal output when either one mode is selected, which comprises:

a step of measuring photographing first object distance related information;

a step of judging whether the first object distance related information can be used to measure the distance to the object or not by the distance measuring device; and, a step of measuring a second object distance related information in response to the release signal output in the special photographing mode when the special photographing mode is selected and it is judged that the first object distance related information can not be used to determine the distance to the object.

16. A method of measuring an object distance in a camera which is capable of selecting a normal photographing mode and a special photographing mode, and controlling a release operation upon receiving release a signal output when either one mode is selected, which comprises:

a step of measuring first photographing object distance related information;

a step of judging whether the first object distance related information can be used to measure the distance to the object or not by the distance measuring device;

a step of memorizing a judgement data indicating whether the first object distance related information can be used to determine the distance to the object or not when the special photographing mode is selected; and, a step of measuring second object distance related information when the special photographing mode is selected and data indicating the impossibility of object distance measurement using the first object distance related information is memorized in the memory upon outputting of the release signal in the special photographing mode.

17. A method of measuring an object distance in a camera which is capable of selecting a normal photographing mode and a special photographing mode, and controlling a release operation upon receiving a release signal output when either one mode is selected, which comprises:

a step of measuring first photographing object distance related information;

a step of memorizing object distance related data when the special photographing mode is selected and it is judged that the first object distance related information can be used to measure the distance to the object, and not memorizing the object distance related data when it is judged that the first object distance related information can not be used to measure the distance to the object;

a step of controlling a lens drive based on the first object distance related information output from the distance measuring device when the normal photographing mode is selected and the distance to the object can be measured therefrom; and, a step of controlling the lens drive based on the object distance related data memorized in the memory when the special photographing mode is selected and the object distance related data is memorized in the memory.

* * * * *